United States Patent
Hong et al.

(10) Patent No.: US 11,635,969 B2
(45) Date of Patent: Apr. 25, 2023

(54) SYSTEMS AND METHODS TO UPDATE ADD-ON CARDS FIRMWARE AND COLLECT HARDWARE INFORMATION ON ANY SERVERS WITH ANY OS INSTALLED OR BARE-METAL SERVERS

(71) Applicant: HITACHI VANTARA LLC, Santa Clara, CA (US)

(72) Inventors: Francis Kin-Wing Hong, Santa Clara, CA (US); Arturo Cruz, Santa Clara, CA (US); Liren Zhao, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/779,119

(22) PCT Filed: Jan. 23, 2020

(86) PCT No.: PCT/US2020/014835
§ 371 (c)(1),
(2) Date: May 23, 2022

(87) PCT Pub. No.: WO2021/150229
PCT Pub. Date: Jul. 29, 2021

(65) Prior Publication Data
US 2023/0031302 A1 Feb. 2, 2023

(51) Int. Cl.
*G06F 13/38* (2006.01)
*G06F 9/4401* (2018.01)
(Continued)

(52) U.S. Cl.
CPC .......... *G06F 9/4406* (2013.01); *G06F 9/5044* (2013.01); *G06F 9/5072* (2013.01); *G06F 9/541* (2013.01)

(58) Field of Classification Search
CPC ...... G06F 13/38; G06F 9/4406; G06F 9/5044; G06F 9/5072; G06F 9/541
See application file for complete search history.

(56) References Cited

U.S. PATENT DOCUMENTS

| 2007/0168571 A1 | 7/2007 | Ramsey et al. |
| 2007/0169090 A1 | 7/2007 | Kang |

(Continued)

OTHER PUBLICATIONS

Holland, W.G. et al., "BladeCenter Storage." In: IBM Journal of Research and Development. Nov. 2005 (Nov. 2005) Retrieved on Mar. 23, 2020 (Mar. 23, 2020) from <https://pdfs.semanticscholar.org/3738/1e66dda03a7beb9ae7fc9f839b969e74dbac4.pdf> entire document.

(Continued)

*Primary Examiner* — Cheng Yuan Tseng
(74) *Attorney, Agent, or Firm* — Procopio, Cory, Hargreaves & Savitch LLP (57) ABSTRACT

Systems and methods described herein are directed to upgrading one or more of add-on firmware and disk firmware for a server, which can involve connecting a port of the server to an isolated network, the isolated network dedicated to firmware upgrades for the server; caching onto cache memory of the server, an operating system received through the isolated network; booting the operating system on the server from the cache memory; conducting an Network File System (NFS) mount on the server to determine hardware information associated with the upgrading of the one or more of the add-on firmware and the disk firmware; and upgrading the one or more of the add-on firmware and the disk firmware based on the hardware information.

15 Claims, 6 Drawing Sheets

(51) Int. Cl.
    *G06F 9/54*    (2006.01)
    *G06F 9/50*    (2006.01)

(56) References Cited

U.S. PATENT DOCUMENTS

| 2009/0282128 A1 | 11/2009 | Le et al. |
| 2012/0260242 A1 | 10/2012 | Nguyen et al. |
| 2014/0109076 A1 | 4/2014 | Boone et al. |

OTHER PUBLICATIONS

International Search Report for related Application No. PCT/US2020/014835, dated May 5, 2020, 2 pages.
Written Opinion of the International Searching Authority for related Application No. PCT/US2020/014835, dated May 5, 2020, 5 pages.

```
VendorX93180YC-EX-17# conf t
Enter configuration commands, one per line. End with CNTL/Z.
VendorX93180YC-EX-17(config)# interface ethernet 1/29
VendorX93180YC-EX-17(config-if)# switchport mode trunk
VendorX93180YC-EX-17(config-if)# switchport truck allowed vlan add 7

VendorX93180YC-EX-17(config)# interface ethernet 1/30
VendorX93180YC-EX-17(config-if)# switchport mode trunk
VendorX93180YC-EX-17(config-if)# switchport truck allowed vlan add 7
```

SYSTEMS AND METHODS TO UPDATE ADD-ON CARDS FIRMWARE AND COLLECT HARDWARE INFORMATION ON ANY SERVERS WITH ANY OS INSTALLED OR BARE-METAL SERVERS

BACKGROUND

Field

The present disclosure is related to data centers, and more specifically, to facilitating updates to firmware for add-on cards and disks in servers of the data center.

Related Art

In a data center, servers come with different vendors, models, and configurations. In many cases, the servers are configured with numerous add-on cards such as different Network Interface Controllers (NICs), Host Bus Adapters (HBAs), disk controllers and more. To maintain the firmware (FW) versions of such add-on cards to match the different versions of operating system (OS) types (e.g., CentOS, RedHat LINUX, MS Windows, VMWare ESXi, and more) is a very costly task. System admins need to use the specific utilities provide by the add-on card vendors to update the FW. However, the utilities provided form the add-on card vendors are only available for limited OSs.

In related art implementations, system admins need to manually reboot each of the servers to a specific OS supported by the card vendors and apply the add-on card utilities to apply the FW update process. Further, system admins need to find out the hardware information of the servers before the FW update process can be started. Collecting hardware information on different platforms with different OS types can be challenging. In the data center, the system admins can face such issues constantly, and can involve data centers with hundreds of servers.

SUMMARY

Related art implementations utilize the Baseboard Management Controller (BMC) virtual media to reboot the server with the add-on cards vendor support OS and carry out the FW update. However, such implementations can be server vendor-specific, and require application programming interface (APIs) from the vendor or tools to create the virtual media mount for the PC reboot to the different OS. Another related art implementation involves utilizing the Preboot Execution Environment (PXE) boot to allow the selected server to reboot to a specific OS for the FW update. Such solutions can address the limitation of vendor specific servers, but creates another issue of colliding the production PXE servers and Dynamic Host Configuration Protocol (DHCP) servers. Related art implementations add extra NIC to isolate the DHCP servers and PXE which, increases the complexity of the network and operation cost.

Example implementations described herein involve systems and methods for a set of API endpoints which allow any applications to integrate with a deployment manager to perform the hardware information collection and add-on cards FW update, seamlessly.

Aspects of the present disclosure can include a method for upgrading one or more of add-on firmware and disk firmware for a server, the method involving connecting a port of the server to an isolated network; caching onto cache memory of the server, an operating system received through the isolated network; booting the operating system on the server from the cache memory; conducting a Network File System (NFS) mount on the server to determine hardware information associated with the upgrading of the one or more of the add-on firmware and the disk firmware; and upgrading the one or more of the add-on firmware and the disk firmware based on the hardware information.

Aspects of the present disclosure can further include a computer program, storing instructions for upgrading one or more of add-on firmware and disk firmware for a server, the instructions involving connecting a port of the server to an isolated network; caching onto cache memory of the server, an operating system received through the isolated network; booting the operating system on the server from the cache memory; conducting a Network File System (NFS) mount on the server to determine hardware information associated with the upgrading of the one or more of the add-on firmware and the disk firmware; and upgrading the one or more of the add-on firmware and the disk firmware based on the hardware information. The instructions may be stored on a non-transitory computer readable medium and configured to be executed by one or more processors.

Aspects of the present disclosure can further include a management node configured to upgrade one or more of add-on firmware and disk firmware for a server, the management node involving a processor, configured to connect a port of the server to an isolated network; cache onto cache memory of the server, an operating system received through the isolated network; boot the operating system on the server from the cache memory; conduct a Network File System (NFS) mount on the server to determine hardware information associated with the upgrading of the one or more of the add-on firmware and the disk firmware; and upgrade the one or more of the add-on firmware and the disk firmware based on the hardware information.

Aspects of the present disclosure can further include a system for upgrading one or more of add-on firmware and disk firmware for a server, the system involving means for connecting a port of the server to an isolated network; means for caching onto cache memory of the server, an operating system received through the isolated network; means for booting the operating system on the server from the cache memory; means for conducting a Network File System (NFS) mount on the server to determine hardware information associated with the upgrading of the one or more of the add-on firmware and the disk firmware; and means for upgrading the one or more of the add-on firmware and the disk firmware based on the hardware information.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Today's system admins are facing a difficult task to maintain production servers with supported/certified up-to-date software, FW for server hardware and FW for the add-on devices (i.e., NICs, HBAs, disk controllers, and disks) for reliability, performance and security requirements. Updating FW for the add-on cards are not straight forward. It involves finding the correct upgrade path and using proper utilities provided by the add-on card vendors. These utilities can only be used in a small list of supported OSs. This solution offers a server vendor-agnostic automated mechanism to perform a seamless add-on card FW update. In this solution, a dedicated Firmware Update Network (FUN) will be automatically created in the layer-2 network, only single port on the switch will be configured with specific native ULAN ID for the FUN and it will be restored back to the original setting upon the completion of the add-on cards FW update. A customized PXE image with NFS root volume (a highly modified CentOS with a very small footprint) boots from a dedicated PXE server reside on Deployment Manager withing the dedicated. The combination of PXE boot and root volume through NFS mount enable us to update add-on cards FW bundles without creating any ISO image for PXE boot that allows us change FW and process on-the-fly. IPMI Tool and RedFish protocol will be used to control the boot sequence on the selected server for FW update and hardware information will be collected during the process, as well. To further secure the communication between the server being updated and the Deployment Manager, the server's unique MAC addresses will be registered with the Deployment Manager DHCP on the PXE server. The Deployment Manager PXE server will only answer the registered MAC addresses. This PXE server is managed by the Deployment Manager in a docker container to reduce overhead and harden security.

Example implementations involve an automated process to construct a dedicated Firmware Update Network (FUN) for add-on cards FW update and hardware information collection. This network provides a secured layer-2 network environment to eliminate the disruption on the production environment. Since all the changes are done in the layer-2 network, it makes the solution highly scalable and server vendor agnostic. Furthermore, the PXE server in the FUN is one of the many docker containers with the deployment manager (DM) that provides a tightly integrated microservice for less overhead. With all these measurements, the example implementations described herein facilitate a highly secured and non-disruptive solution with the production PXE servers and DHCP servers.

Through the example implementations described herein, any server connected to the network can undergo appropriate add-on cards/disk FW upgrades, thereby allowing the data center to be vendor agnostic with respect to the servers that are connected. The example implementations can be applied to any server regardless of the underlying configuration, and does not need any extra equipment to facilitate the add-on cards/disk FW upgrades.

Example implementations also facilitate APIs such as network file system (NFS) mounts that facilitate the hardware information collection as well as the add-on cards/disk FW update. In an example, the APIs of the NFS mount can facilitate hardware information collection such as, but not limited to, the type of add-on card in the server, the type of disk drive(s), the type of servers, the server configuration (e.g., processors or memory used), the slots in the server, and so on in accordance with the desired implementation.

Example implementations utilize an isolated network to facilitate the firmware update as will be described herein. Through utilizing an isolated network separate from the production network, example implementations thereby safeguard the Deployment Manager PXE server and DHCP server in the production environment from unwanted internet protocol address assignments to the production environment. Further, the isolated network maintains security by safeguarding the PXE operating system used to boot up the server and to execute add-on cards/disk FW update through restricting the access through the deployment manager of the management node, which manages access to the docker container. In example implementations as described herein, the PXE server will be facilitated by docker containers to provide portability, security and reduce the dedicated resources overhead. In example implementations involving clusters of production environments, multiple instances of the docker container as described herein can be spawned for each cluster to facilitate the desired implementation.

Example implementations can be applied to a single server update (e.g., single server in a production environment to avoid significant downtime) or multiple servers update concurrently (e.g., non-production environment rapid deployment).

Figure 1A:
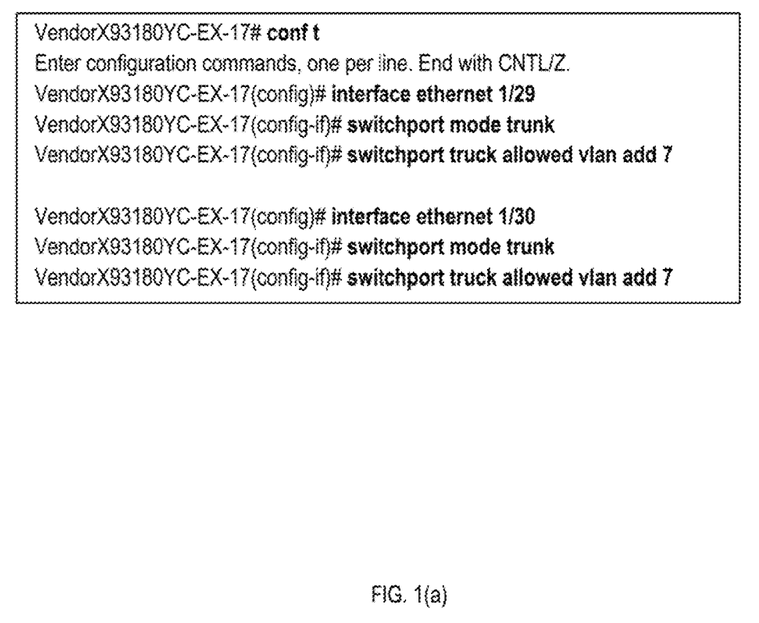
FIG. 1(a) illustrates an example configuration for a firmware update network, in accordance with an example implementation.

FIG. 1(a) illustrates an example configuration for a firmware update network, in accordance with an example implementation. In the example of FIG. 1(a), a server operating in a production environment is being updated. Through the DM interface, the user can select the servers need to be updated. Since this is a production server, the server will be put in the maintenance mode first to avoid the total disruption for its corresponding cluster. The DM starts to configure the FUN in the background automatically. During the process to configure the FUN, the DM establishes a secure shell (SSH) to the switch (e.g., in this example, a switch made by VendorX), conducts a backup of the paired ports configuration, changes the default virtual local area network (VLAN) on the ports, and then creates the VLAN. FIG. 1(a) illustrates an example of configuring a FUN with VLAN ID 7.

Figure 1B:
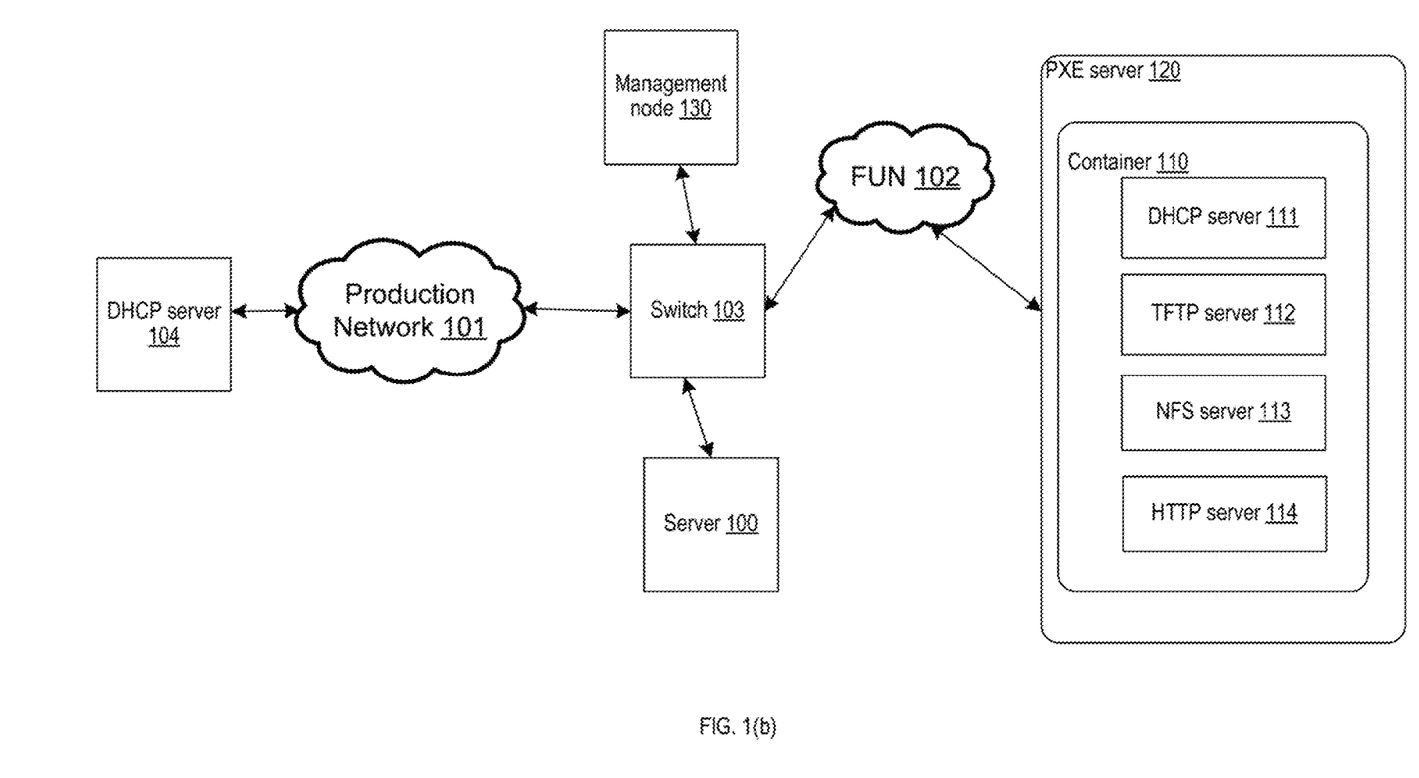
FIG. 1(b) illustrates an example system, in accordance with an example implementation.

FIG. 1(b) illustrates an example system, in accordance with an example implementation. In an example implementation, there is a server 100 or multiple servers that are to have firmware updates to the add-on cards or disks. Such servers are connected to a switch 103 and can be connected to a production network 101 and interacting with the DHCP server 104 of the production environment. When the management node 130 is instructed to conduct firmware updates, management node 130 initiates the configuration as illustrated in FIG. 1(*a*) to create FUN 102, which connects the server 100 to the PXE boot server 120. PXE boot server 120 may involve one or more containers 110 that can include a DHCP server 111 for the FUN 102, a trivial file transfer protocol (TFTP) server 112, a Network File System (NFS) server 113, and a Hypertext Transfer Protocol (HTTP) server. Each of the one or more containers 110 can correspond to a particular cluster of servers in a production environment as managed by switch 103 or another switch depending on the desired implementation. Management node 130 executes DM to configure switch 103 as illustrated in FIG. 1(*a*). Depending on the desired implementation, PXE boot server 120, and container 110 can be provided via a virtual machine (VM) spanning over a plurality of servers on a cloud. In such an example implementation, the VM and the DM can both be managed by management node 130.

After the FUN 102 has been created, the DM will discover the corresponding paired media access control (MAC) address of the NIC of the server selected for the firmware update and register the MAC to the DHCP server 111 in PXE boot server 120 to ensure that the DHCP server 111 will not provide an Internet Protocol (IP) address to any production server that is not intended to be involved with the add-on cards FW update. DM then initiates a reset (e.g., such as an ESXi reset) with an Intelligent Platform Management Interface (IPMI) Tool. Once the targeted server 100 is active from reboot, the DM will start the add-on cards update process.

Upon the completion of the entire process, DM will restore the port configuration in switch 103.

Figure 2A:
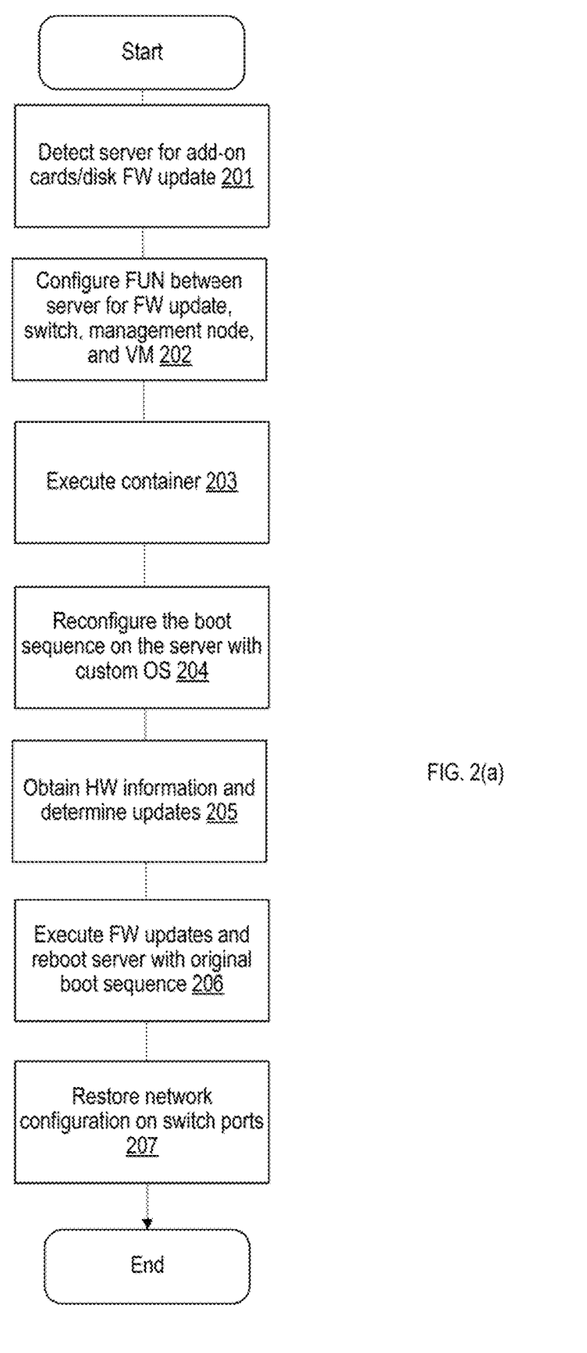
FIG. 2(a) illustrates an example overall flow for the add-on cards/disk firmware update by the management node, in accordance with an example implementation.

FIG. 2(*a*) illustrates an example overall flow for the add-on cards/disk firmware update by the management node 130, in accordance with an example implementation. At first at 201, the management node 130 detects a server (e.g., server 100) that requires an add-on cards/disk FW update. At 202, the management node 130 configures switch 103 to create a dedicated FUN 102 between the server 100, the switch 103, the management node 130, and the VM/PXE server 120.

At 203, the management node 130 initiates the docker container for PXE boot server 120 with a selected server unique NIC MAC registered on the PXE boot server 120 to avoid colliding with the production PXE servers. At 204, the management node 130 reconfigures the boot sequence on the select server 100 and initiates a reboot to let the server boot up with the customized PXE-LiveOS.

At 205, after the server 100 completes the bootup process, the management node 130 starts the process of collecting hardware information on the server 100 and the corresponding add-on cards/disk FW update process. The update process is executed through the customized PXE-LiveOS. The management node 130 collects the hardware information and determines what version of firmware is to be used for the update.

At 206, upon completion of the add-on cards FW update process, the management node 130 reboots the server 100 with the original boot sequence. At 207, the management node 130 restores the network configuration on the switch ports of switch 103 that were configured in the FUN. The process then ends, and the management node 130 can provide a report regarding the add-on cards/disk FW update as being completed, as well as the hardware information.

Figure 2B:
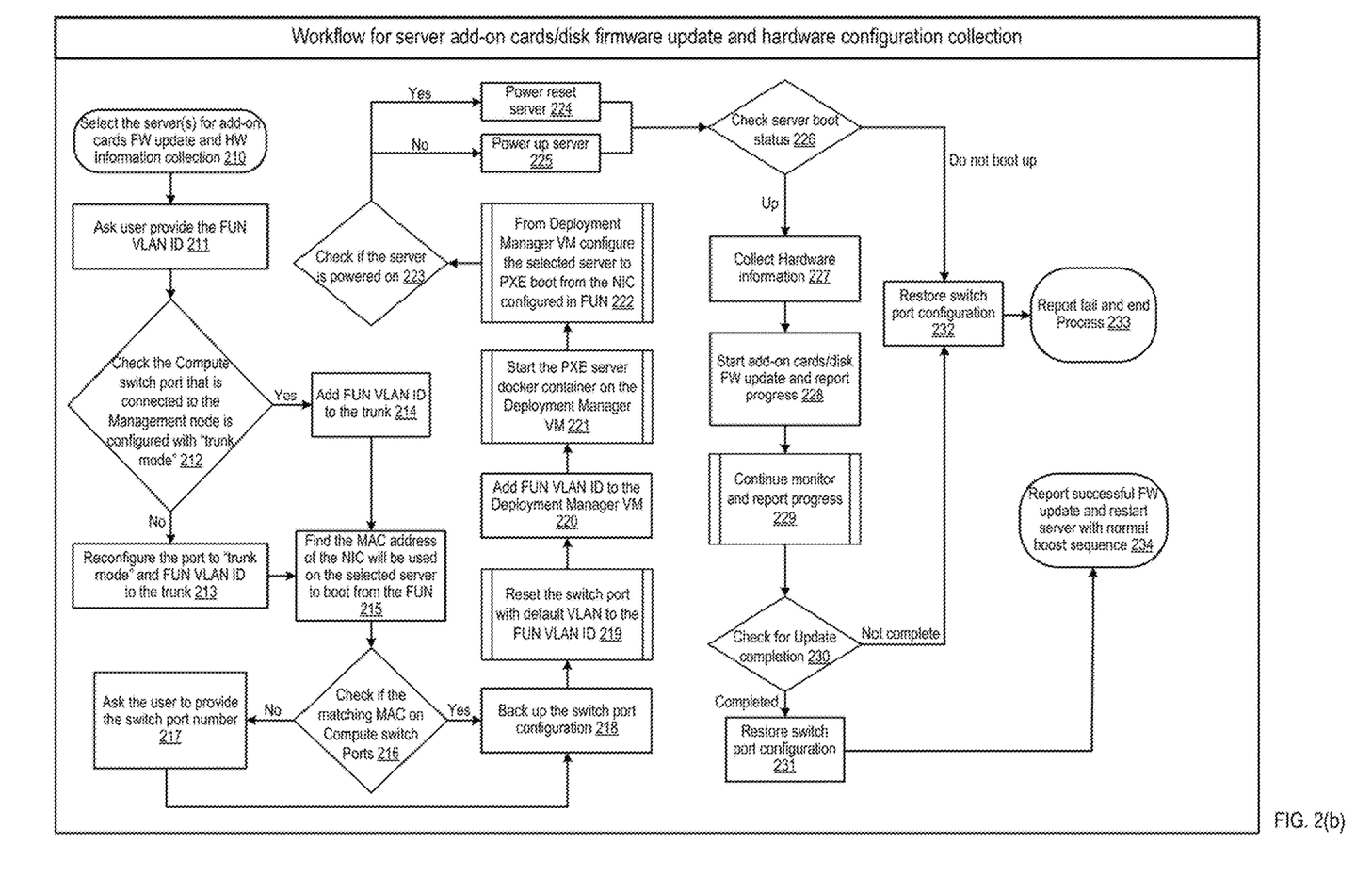
FIG. 2(b) illustrates an example flow upon which example implementations can be applied.

FIG. 2(*b*) illustrates an example flow upon which example implementations can be applied. At first, the administrator selects the server(s) for add-on cards/disk FW update and HW information collection through the deployment manager interface at 210. At 211, the user is asked to provide the FUN VLAN ID. Once the FUN VLAN ID is provided, at 212, a check is conducted to determine if the compute switch port that is connected to the Management node is configured with "trunk mode" 212. If so (yes), then the flow proceeds to 214 to add the FUN VLAN ID to the trunk 214, otherwise (No) the flow proceeds to 213 to reconfigure the port to "trunk mode" and FUN VLAN ID to the trunk 213. At 215, the process finds the MAC address of the NIC that will be used on the selected server to boot from the FUN 215.

At 216, the flow checks if there is a matching MAC on the compute switch ports. If not (No), then the flow provides an interface for the user to provide the switch port number at 217. Otherwise (Yes) the flow proceeds to 218 to back up the switch port configuration. At 219, the flow resets the switch port with default VLAN to the FUN VLAN ID 219. At 220, the flow adds the FUN VLAN ID to the Deployment Manager VM.

At 221, the flow starts the PXE server docker container on the Deployment Manager VM. At 222, the Deployment Manager VM configures the selected server to PXE boost from the NIC configured in FUN.

At 223, the flow checks if the server is powered on. If so (Yes), then the flow proceeds to 224 to conduct a power reset on the server. Otherwise (No) the flow proceeds to 225 to conduct a power up of the server.

At 226, the flow checks the server boot status. If the server is to boot up (Up) then the flow proceeds to 227, otherwise (Do not boot up) the flow proceeds to 232 to restore the switch port configuration and to 233 to report that a failure has occurred and to end the flow.

At 227, the flow proceeds to collect HW information. At 228, the flow initiates the add-on cards/disk FW update and provides a report on the progress. At 229, the flow continues to monitor and report on the progress of the FW update. At 230, a check is conducted to determine update completion. If completed then the flow proceeds to 231, otherwise, the flow proceeds to 232.

At 231, the flow restores switch port configuration 231 and proceeds to 234 to report a successful FW update and restart the server with normal boost sequence.

Figure 3:
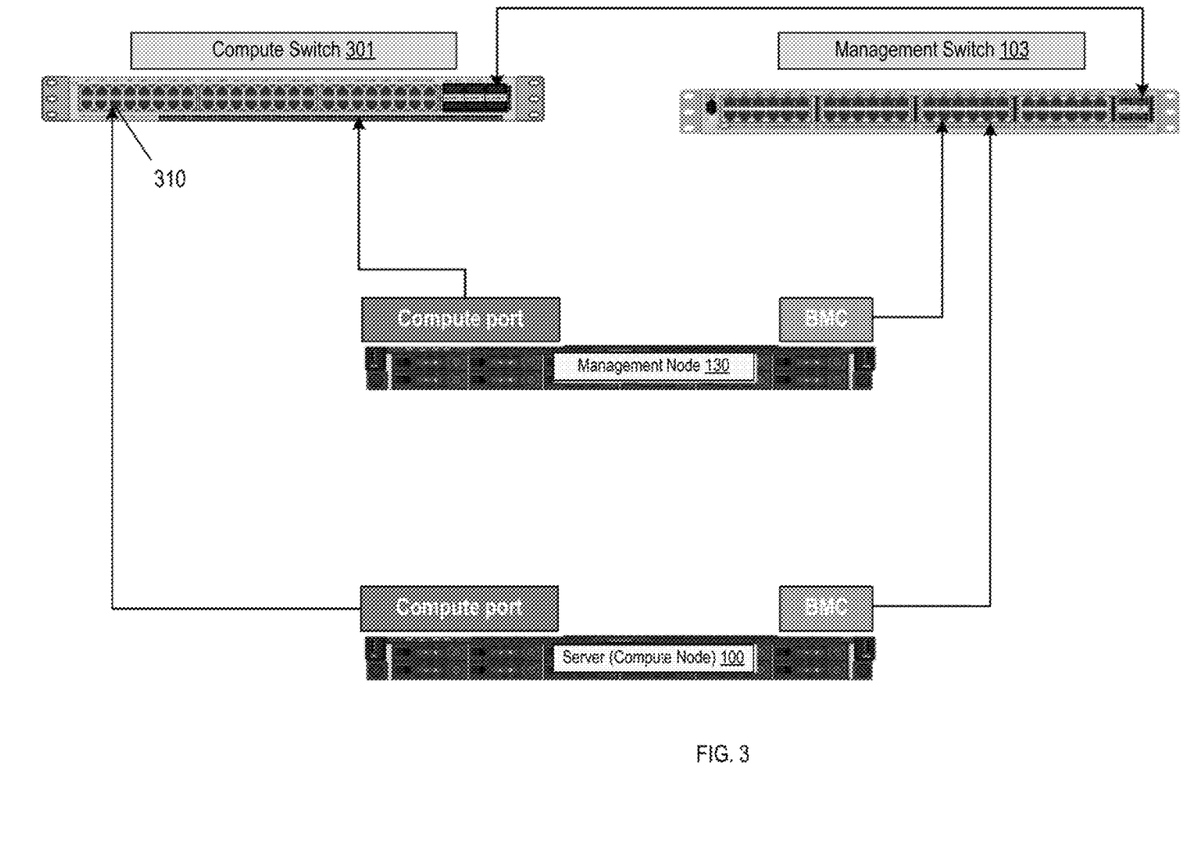
FIG. 3 illustrates an example topology in the production environment, in accordance with an example implementation.

FIG. 3 illustrates an example topology in the production environment, in accordance with an example implementation. In the example implementation, the production network 101 is managed by a compute switch 301. The server 100 in this example is a compute node. At 310, the management node 130 instructs the compute switch 310 managing the production network to temporarily change the default, native VLAN to the VLAN ID of the FUN. The FUN VLAN thereby connects the server 100 to the PXE server so that a server PXE boot can be executed to perform the add-on cards/disk FW update. As illustrated at 212 of FIG. 2(*b*), compute switch 301 is to be configured with the trunk mode, so that the FUN VLAN ID is added. The FUN is an isolated network, which allows the compute switch 301 to have a port to server 100 that is isolated from the production network 101, thereby eliminating issues with interference with the PXE or DHCP servers in the production environment.

The deployment manager VM is executed on the management node 130, which provides the docker container as a PXE server and facilitates the add-on cards/FW update.

Example implementations described herein use an isolated and dedicated FUN to control a selected server to boot from a dedicated and highly secured PXE server as a docker container as managed by a management node. The PXE server provides a highly customized operating system such as CentOS PXE-LiveOS to perform add-on cards or disk FW update. Through such example implementations, it can thereby be possible to simplify the add-on cards/disk FW update and hardware management with consistency regardless of the underlying server configuration.

Figure 4:
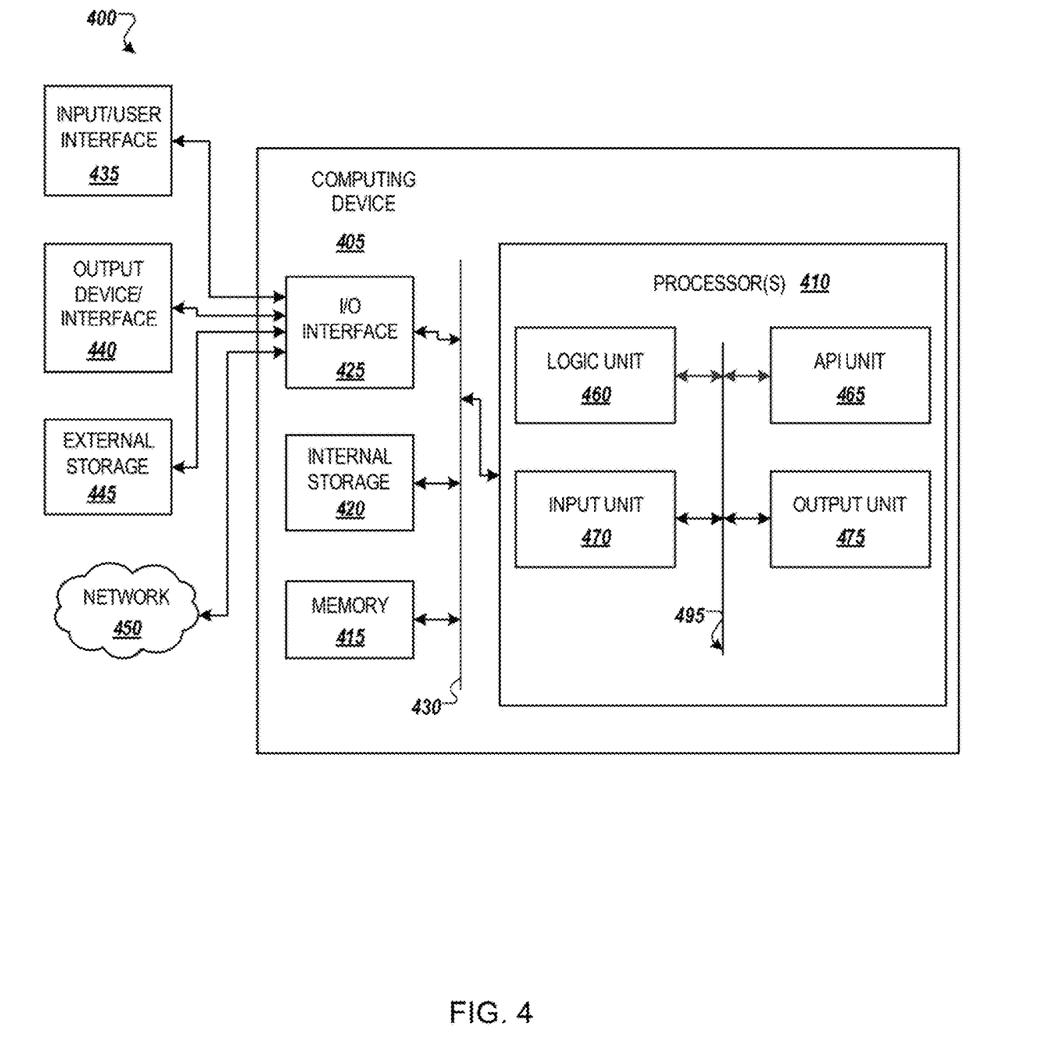
FIG. 4 illustrates an example computing environment with an example computer device suitable for use in some example implementations.

FIG. 4 illustrates an example computing environment with an example computer device suitable for use in some example implementations, such as a management node as illustrated in FIGS. 1(b) and 3 to facilitate the functions of the deployment manager. Computer device 405 in computing environment 400 can include one or more processing units, cores, or processors 410, memory 415 (e.g., RAM, ROM, and/or the like), internal storage 420 (e.g., magnetic, optical, solid state storage, and/or organic), and/or I/O interface 425, any of which can be coupled on a communication mechanism or bus 430 for communicating information or embedded in the computer device 405. I/O interface 425 is also configured to receive images from cameras or provide images to projectors or displays, depending on the desired implementation.

Computer device 405 can be communicatively coupled to input/user interface 435 and output device/interface 440. Either one or both of input/user interface 435 and output device/interface 440 can be a wired or wireless interface and can be detachable. Input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 440 may include a display, television, monitor, printer, speaker, braille, or the like. In some example implementations, input/user interface 435 and output device/interface 440 can be embedded with or physically coupled to the computer device 405. In other example implementations, other computer devices may function as or provide the functions of input/user interface 435 and output device/interface 440 for a computer device 405.

Examples of computer device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 405 can be communicatively coupled (e.g., via I/O interface 425) to external storage 445 and network 450 for communicating with any number of networked components, devices, and systems, including one or more computer devices of the same or different configuration. Computer device 405 or any connected computer device can be functioning as, providing services of, or referred to as a server, client, thin server, general machine, special-purpose machine, or another label.

I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computer device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. One or more applications can be deployed that include logic unit 460, application programming interface (API) unit 465, input unit 470, output unit 475, and inter-unit communication mechanism 495 for the different units to communicate with each other, with the OS, and with other applications (not shown). The described units and elements can be varied in design, function, configuration, or implementation and are not limited to the descriptions provided. Processor(s) 410 can be in the form of hardware processors such as central processing units (CPUs) or in a combination of hardware and software units.

In some example implementations, when information or an execution instruction is received by API unit 465, it may be communicated to one or more other units (e.g., logic unit 460, input unit 470, output unit 475). In some instances, logic unit 460 may be configured to control the information flow among the units and direct the services provided by API unit 465, input unit 470, output unit 475, in some example implementations described above. For example, the flow of one or more processes or implementations may be controlled by logic unit 460 alone or in conjunction with API unit 465. The input unit 470 may be configured to obtain input for the calculations described in the example implementations, and the output unit 475 may be configured to provide output based on the calculations described in example implementations.

Processor(s) 410 can be configured to facilitate the upgrading of one or more of add-on firmware and disk firmware for a server, through connecting a port of the server to an isolated network (e.g., the FUN) as illustrated at 212-214 of FIG. 2(b); caching onto cache memory of the server, an operating system received through the isolated network as part of 221 and 22 of FIG. 2(b), booting the operating system on the server from the cache memory as illustrated at 223-226 of FIG. 2(b), conducting a Network File System (NFS) mount on the server to determine hardware information associated with the upgrading of the one or more of the add-on firmware and the disk firmware as illustrated at 227 and 228 of FIG. 2(b); and upgrading the one or more of the add-on firmware and the disk firmware based on the hardware information as illustrated at 229-231 of FIG. 2(b).

In example implementations, the booting the operating system involves executing a Preboot Execution Environment (PXE) boot as illustrated at 222 of FIG. 2(*b*). The PXE boot can be legacy PXE and/or modem iPXE to facilitate the desired implementation.

As illustrated in FIG. 1(*a*) and FIG. 3, the generating the isolated network involves changing a native Virtual Local Area Network (VLAN) of an associated switch port. The associated switch port can be changed back to the native VLAN after upgrading is complete to connect the server back to the production environment.

Processor(s) 410 can be configured to register a media access control (MAC) address of the server to a Preboot Execution Environment (PXE) server as illustrated in FIG. 1(*b*) and FIG. 3, and assign an internet protocol (IP) address to the registered MAC address of the server after generating the isolated network as illustrated at 215 to 220 in FIG. 2(*b*). The sharing of the container 110, including the APIs of the DHCP server 1111, the TFTP server 112, and the NFS server 113 used for the NFS mount are then restricted to the assigned IP address. Hardware information of the server can thereby be generated by APIs from the NES mount.

Processor(s) 410 can be configured to upgrade the one or more of the add-on firmware and the disk firmware based on the hardware information by comparing the hardware information with a previous bundle of the one or more of the add-on firmware and the disk firmware provided by the deployment manager. In example implementations, the management node manages in memory 405 the version status of all add-on cards and disk firmware for all of the servers connected to the production environment. In such example implementations, the servers in the production network can be upgraded in a sequential manner until all servers have the appropriate upgrades. Example implementations can thereby track what bundles were deployed for a particular cluster of servers and then compare the hardware information of the server to the bundle applied to that particular cluster. Such example implementations can be facilitated in any manner known to a person of ordinary skill in the art.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for upgrading one or more of add-on firmware and disk firmware for a server, the method comprising:
   connecting a port of the server to an isolated network;
   caching onto cache memory of the server, an operating system received through the isolated network;
   booting the operating system on the server from the cache memory;
   conducting a Network File System (NFS) mount on the server to determine hardware information associated with the upgrading of the one or more of the add-on firmware and the disk firmware; and
   upgrading the one or more of the add-on firmware and the disk firmware based on the hardware information.

2. The method of claim 1, wherein the booting the operating system comprises executing a Preboot Execution Environment (PXE) boot.

3. The method of claim 1, wherein the generating the isolated network comprises changing a native Virtual Local Area Network (VLAN) of an associated switch port.

4. The method of claim 3, further comprising changing the associated switch port back to the native VLAN after upgrading.

5. The method of claim 3, the method further comprising registering a media access control (MAC) address of the server to a Preboot Execution Environment (PXE) server, and assigning an internet protocol (IP) address to the registered MAC address of the server after generating the isolated network;
wherein sharing of NFS used in conducting the NFS mount is restricted to the assigned IP address.

6. The method of claim 1, wherein the upgrading the one or more of the add-on firmware and the disk firmware based on the hardware information comprises comparing the hardware information with a previous bundle of the one or more of the add-on firmware and the disk firmware provided by the deployment manager.

7. The method of claim 1, wherein the hardware information is generated by application programming interfaces (APIs) from the NFS mount.

8. A non-transitory computer readable medium, storing instructions for upgrading one or more of add-on firmware and disk firmware for a server, the instructions comprising:
connecting a port of the server to an isolated network;
caching onto cache memory of the server, an operating system received through the isolated network;
booting the operating system on the server from the cache memory;
conducting a Network File System (NFS) mount on the server to determine hardware information associated with the upgrading of the one or more of the add-on firmware and the disk firmware; and
upgrading the one or more of the add-on firmware and the disk firmware based on the hardware information.

9. The non-transitory computer readable medium of claim 8, wherein the booting the operating system comprises executing a Preboot Execution Environment (PXE) boot.

10. The non-transitory computer readable medium of claim 8, wherein the generating the isolated network comprises changing a native Virtual Local Area Network (VLAN) of an associated switch port.

11. The non-transitory computer readable medium of claim 10, the instructions further comprising changing the associated switch port back to the native VLAN after upgrading.

12. The non-transitory computer readable medium of claim 10, the instructions further comprising registering a media access control (MAC) address of the server to a Preboot Execution Environment (PXE) server, and assigning an internet protocol (IP) address to the registered MAC address of the server after generating the isolated network;
wherein sharing of NFS used in conducting the NFS mount is restricted to the assigned IP address.

13. The non-transitory computer readable medium of claim 8, wherein the upgrading the one or more of the add-on firmware and the disk firmware based on the hardware information comprises comparing the hardware information with a previous bundle of the one or more of the add-on firmware and the disk firmware provided by the deployment manager.

14. The non-transitory computer readable medium of claim 8, wherein the hardware information is generated by application programming interfaces (APIs) from the NFS mount.

15. A management node configured to upgrade one or more of add-on firmware and disk firmware for a server, the management node comprising:
a processor, configured to:
connect a port of the server to an isolated network;
cache onto cache memory of the server, an operating system received through the isolated network;
boot the operating system on the server from the cache memory;
conduct a Network File System (NFS) mount on the server to determine hardware information associated with the upgrading of the one or more of the add-on firmware and the disk firmware; and
upgrade the one or more of the add-on firmware and the disk firmware based on the hardware information.

\* \* \* \* \*